United States Patent Office 3,070,997
Patented Jan. 1, 1963

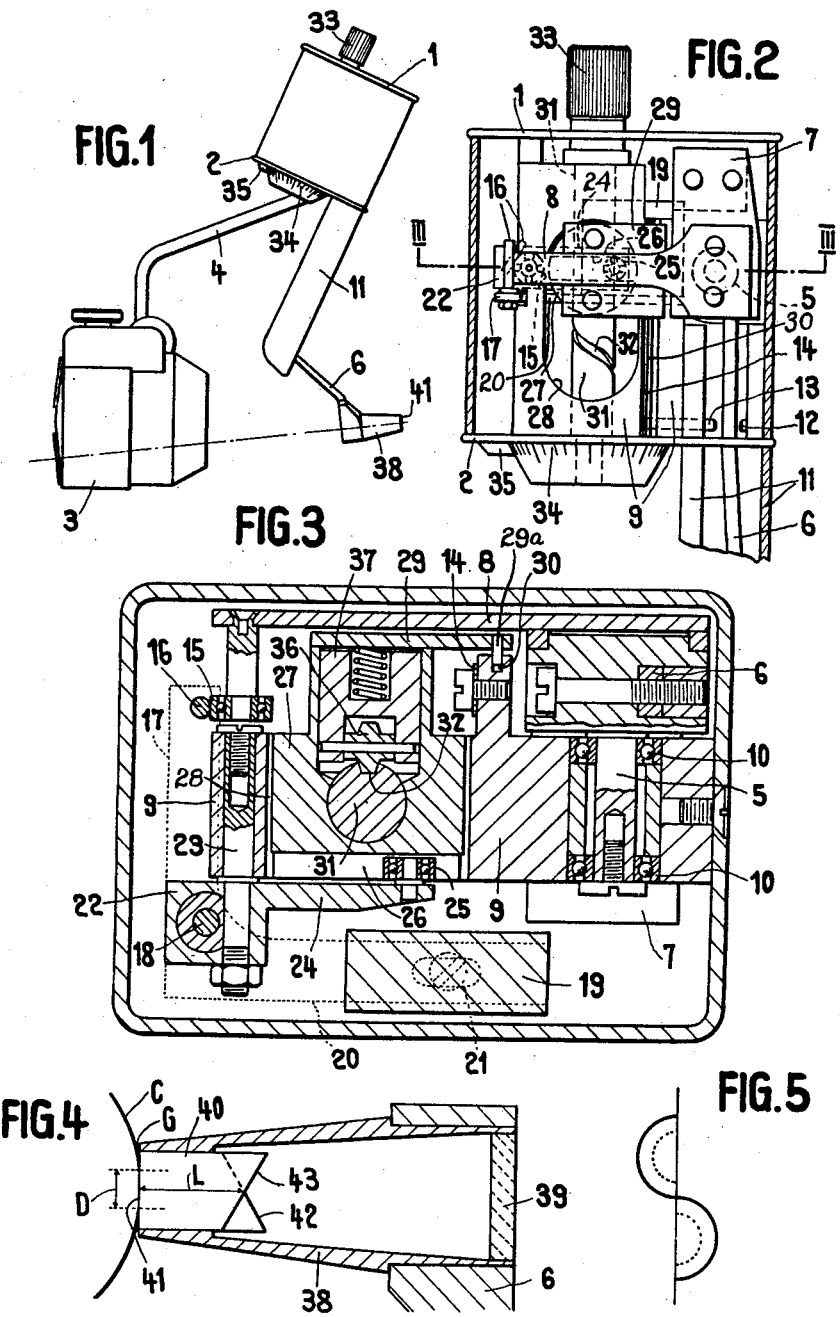
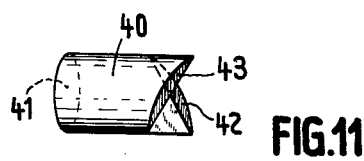

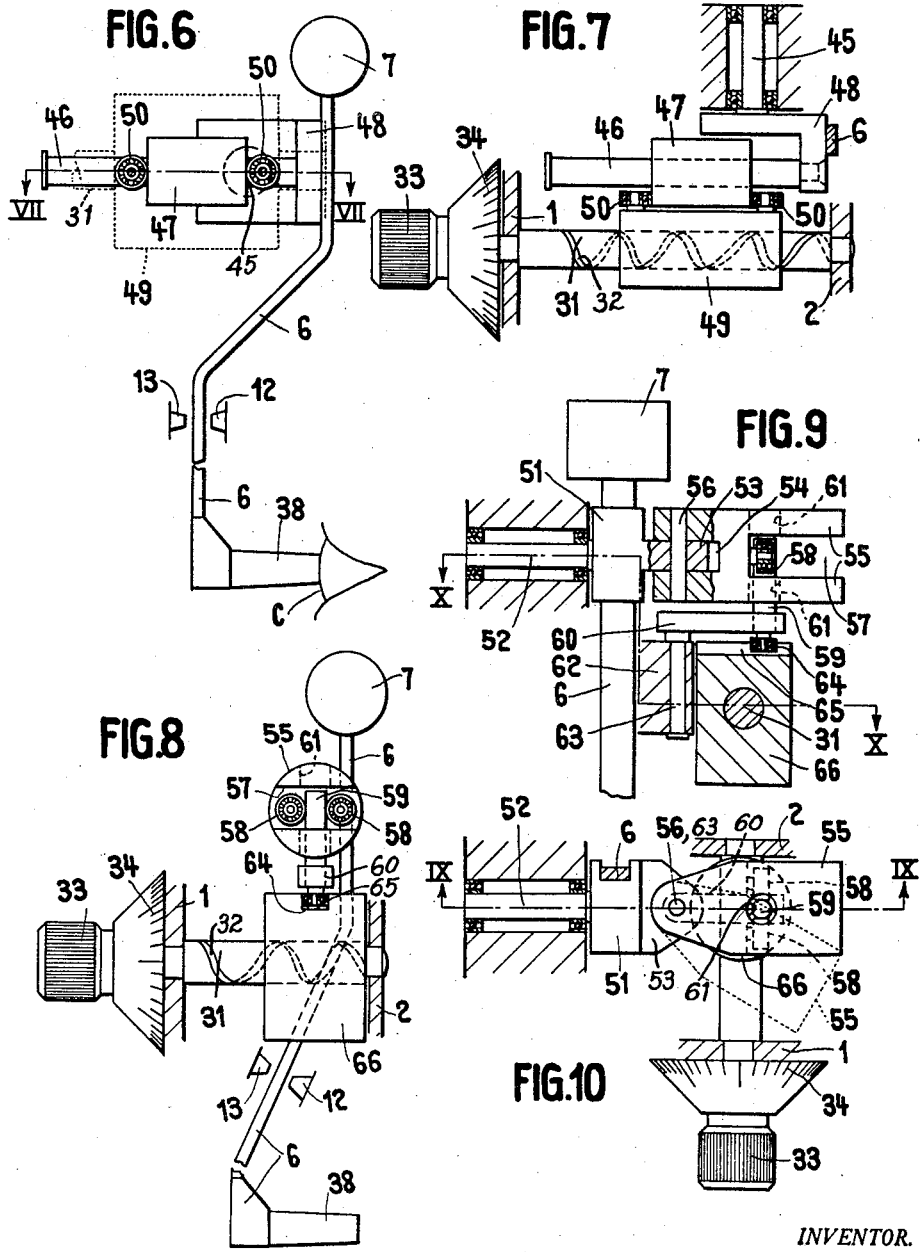

3,070,997
APPARATUS FOR MEASURING THE INTRAOCULAR OR TONOMETRIC PRESSURE OF AN EYE
Franz Papritz, Liebefeld-Bern, and Hans Goldmann and Theodor Schmidt, Bern, Switzerland, assignors to Haag-Streit A.G., Liebefeld-Bern, Switzerland, a corporation of Switzerland
Filed Apr. 4, 1958, Ser. No. 726,459
Claims priority, application Great Britain June 29, 1957
18 Claims. (Cl. 73—80)

This invention relates to improvements in and relating to an apparatus for measuring the intraocular or tonometric pressure of an eye, wherein an area of the cornea of the eye is flattened by applying a plane surface against the eyeball, and wherein the said tonometric pressure is determined from the ratio between the force with which the said surface is applied against the eyeball and the size of the said flattened area of the cornea. It is evident that the intraocular or tonometric pressure opposes deformation and flattening of the cornea whereby the intraocular pressure multiplied with the flattened area equals the force with which the said surface is pressed against the eyeball which is considered to be spheric in its normal unloaded state. From the above relation between the force, the size of the flattened area and the intraocular pressure the latter may be determined from a measure of the force and of the size of the flattened area.

More particularly this invention relates to a measuring method of the above kind, wherein the force with which the said surface is applied against the eyeball is adjusted to a value for which the flattened area has a predetermined constant size for each measurement and the so adjusted force is a measure for the tonometric pressure. Since measurement of small flattened areas with the required accuracy is rather difficult, an area of relatively large size, having a diameter of about 6 mm. was flattened in the measuring method known up to now. When areas of this size are applanated, a relatively high volume of the eyeball is displaced and therefore the intraocular pressure is substantially increased by the measurement and may reach its double value. This makes it necessary to gauge the tonometer on dead eyes.

It is the object of this invention to effect measurement in an absolute sense, that is without gauging of the measuring instrument. However, it is not evident that such an absolute measurement should be possible because flattening of the cornea is not only opposed by the intraocular pressure per se but also by the rigidity of the cornea itself and on the other hand the body carrying the plane surface is pulled towards the eye by adhesion due to the presence of lachrymal fluid or other wetting liquid. When speaking of the rigidity of the cornea in the following description and in attached claims, this is not to be understood in the meaning of the so called scleral rigidity of the whole eye, but refers to the rigidity or elasticity of the cornea per se opposing applanation by the measuring surface of the tonometer. It was found that these influences affecting the measurement but acting in opposite sense only neutralize each other for a rather limited range of size of the flattened area. It is the main object of this invention to make use of this fact and to eliminate the influences of the rigidity of the cornea and of the adhesion between the pressing surface and the eye in that the said predetermined size of the flattened area is chosen in a manner that the force required for elastic deformation of the cornea practically equals the adhesion between the said plane surface and the cornea due to the wetting liquid, for instance the lachrymal fluid, situated between the cornea and the said surface. The said predetermined area has preferably a diameter of 3.06 mm. and a surface of 7.35 mm.² When applying a force of one gram against this surface a pressure of $$\frac{1}{7.35} = .135 \text{ gram/mm.}^2 = 13.5 \text{ grams/cm.}^2$$

acts onto the flattened area, this pressure being equal to the pressure of 10 mm. Hg. Since the tonometric pressure is indicated in mm. Hg the force measured in grams may simply be multiplied by a factor 10 in order to obtain the pressure in mm. Hg. It was found that the said area size of 3.06 mm. is within the range of area sizes for which the falsifying effects of the cornea rigidity and of the adhesion neutralize each other, this range covering sizes of the flattened area of about 2.7 to 4 mm. in diameter. Therefore, by applying the measuring method according to this invention, measuring errors due to the above mentioned effects are avoided.

Since the size of the flattened area is always adjusted to a predetermined value by accordingly adjusting the force with which the said plane surface is urged against the cornea, adjustment and measurement of the area size may substantially be simplified and measuring errors may effectively be avoided when checking of the prescribed size of the flattened area is done in accordance with this invention, by observing the circumference of the flattened area through an optical system in which the circumference of the area is optically divided in two semi-circles which are optically displaced relatively to each other by a distance equal to the diameter of the predetermined flattened area, the prescribed area size being adjusted when its diameter equals the said distance of the optical displacement. Therefore the measurement may be carried out in adjusting the force with which the plane surface is pressed against the cornea and at the same time observing the flattened area through the said optical system. In order to obtain a sharp contour of the flattened area a solution of fluorescein may preferably be applied at the contacting place between the cornea and the said plane surface applied against it.

This invention also relates to a tonometer for carrying out the above measuring method, comprising a body having a plane pressure surface adapted to be applied against the cornea of an eye and further comprising a mechanism for urging the said body against the eye, this tonometer being characterized in that the said mechanism is adjustable during the measurement for varying the weight by which the said body is urged against the eye.

For a better understanding of the invention three forms of a tonometer allowing measurement in accordance with this invention are described below with reference to the drawings in which FIG. 1 is a top view of the first embodiment of the tonometer attached to an observing instrument.

FIG. 2 is a top view of the mechanism of the first embodiment.

FIG. 3 is a section along the line III—III in FIG. 2 on a larger scale.

FIG. 4 is a partial section on a larger scale for illustrating the invention.

FIG. 5 is a schematic illustration for explaining the invention.

FIG. 6 is a side view of a second embodiment of the tonometer.

FIG. 7 is a section along line VII—VII in FIG. 6.

FIG. 8 is a side view of a third embodiment of the tonometer.

FIG. 9 is a section along line IX—IX in FIG. 10.

FIG. 10 is a top view of the third embodiment, partially in section along line X—X in FIG. 9, and FIG. 11 is a perspective view of one essential part of the tonometer.

The tonometer shown in FIGS. 1 to 3 has a frame comprising two mounting plates 1 and 2, the frame being adapted to be attached to a microscope 3 by means of an arm 4. The microscope 3 may preferably be the microscope of a slit-lamp eye testing apparatus, but any other suitable microscope may be used. A cover normally protects the tonometer mechanism mounted between the mounting plates 1 and 2 as is best seen in FIGS. 2 and 3. The pivot shaft 5 of a lever system having a lever arm 6, a balancing counter weight 7 and a lever arm 8 is mounted in a block 9 by means of ball bearings 10. The lever arm 6 horizontally extends through a protecting shell 11 in which the lever arm 6 may execute a swinging motion limited by a fixed stop 12 and a stop 13 loaded by a leaf spring 14.

A ball bearing 15 is carried on the free end of lever arm 8, this ball bearing cooperating with a pressure pin 16 fixed on a vertical arm 17 of a weight lever pivoted on a horizontal shaft 18 and having a weight body 19 attached to a lower horizontal arm 20 of the weight lever. The arm 20 has an oblong hole 21 so that the weight body 19 which is usually screw fastened to this arm may be adjusted when the screw is loosened to the position for which it produces the desired turning moment and force in a manner described later on. The pivot shaft 18 of the weight lever is fixed in a support 22 pivoted on a shaft 23 vertically mounted in the block 9. Support 22 has an arm 24 carrying a ball bearing 25 engaging a groove 26 of a slide block 27 displaceable in an oblong opening 28 of the mounting block 9. The slide block 27 has a guide plate 29 having one or more pins 29a engaging a straight guiding groove 30 of the mounting block 9 thereby providing for strictly linear displacement of the slide block 27 in the opening 28. The slide block 27 may be displaced in axial direction on an actuating spindle 31 having a helical control groove 32 of constant pitch. The actuating spindle 31 may be turned by a control knob 33 and its angular position is indicated by a circular scale 34 cooperating with a fixed reference mark 35. The slide block 27 has a control roller 36 pivoted in a spring loaded sleeve 37 allowing angular adjustment of the control roller for properly engaging the helical control groove 32. On rotation of the actuating spindle 31 the slide block 27 is displaced in axial direction of the spindle.

A tubular body 38 is frictionally held in a bore at the free end of the lever arm 6. The rear end of the tubular body 38 is sealed by means of a disc 39 of a transparent material, whereas the fore end of the body 38 is sealed by means of a cylindrical body 40 of transparent material, having a plane surface 41 at its outer end and two oppositely inclined prism surfaces 42 and 43 at its inner end, each of the said prism surfaces covering one half of the circular face of the cylindrical body 40. In one preferred embodiment of the body 40 the inclination of the prism surfaces 42 and 43 to the body axis, the length L (FIG. 4) of the body 40 from its front surface 41 to the section line of the prism surfaces and the refraction index of the material itself effect that a picture observed through the disc 39 and the prism body 40 is displaced by each prism by 1.53 mm. and since the prisms limited by surfaces 42 and 43 will displace each half of the picture observed through body 38 in opposite directions, such picture halves will appear displaced by 3.06 mm. relatively to each other. The reason for this displacement will be explained later on.

For measuring the tonometric pressure of an eye the plane surface 41 of the body 40 is applied against the cornea C of an eye as schematically illustrated in FIG. 4. Thereby the spring loaded stop 13 for the lever arm 6 will take up shocks and will thereby avoid excessive pressure against the cornea. The apparatus is now so adjusted that the lever arm 6 freely plays between stops 12 and 13 and the spindle 31 and the weight 19 are held in the zero position illustrated in FIGS. 2 and 3. For this position the pressure pin 16 presses against the ball bearing 15 in a direction passing through the axis of the pivot shaft 5 of the lever system 6, 7, 8 and therefore no turning moment is exerted on the lever system and since the lever system is completely balanced and swings in a horizontal plane, no force is applied to the measuring body 38 which is therefore held in contact with the cornea C of the eye without being pressed against it. The spindle 31 is now turned for shifting the slide block 27 downwardly in FIG. 2. This displacement of the block 27 is transmitted over the ball bearing 25 to the arm 24, and consequently the support 22 of the weight lever system is pivoted round its shaft 23 whereby the pressure pin 16 is displaced on the outer race of the ball bearing 15 to a position for instance as shown in dotted lines in FIG. 2. For this turned position of the weight lever system the force transmitted from the pin 16 onto the ball bearing 15 no longer acts in a direction comprising the axis of the pivot shaft of the lever system 6, 7, 8 and therefore a turning moment acts onto this lever system tending to turn the lever arm 6 in anticlockwise direction in FIG. 1 and consequently tending to press the surface 41 of the measuring body 40 against the cornea C of the eye. Since the control groove 26 of the slide block 27 is perpendicular to the axis of the spindle 31 and also to the displacement of the slide block 27 the lateral displacement of the center of gravity of weight 19 out of the section plane III—III in FIG. 2 is strictly proportional to the displacement of the slide block 27, and the effective lever arm increases proportionally to the displacement of the slide block 27 from its zero position. Therefore the force with which the surface 41 of the measuring body 38 is pressed against the cornea C also varies proportionally to the displacement of the slide block 27 and consequently proportionally to the rotation of the spindle 31 having a constant-pitch control groove. For these reasons with the particular construction of the mechanism shown in FIGS. 2 and 3 a linear relation is obtained between the rotation of the spindle 31 and the force with which the surface 41 of the body 40 is pressed against the cornea C and therefore the scale 34 may have a linear division.

When rotating the spindle 31 from its zero position the surface 41 of the measuring body 40 is pressed against the cornea C with increasing force thereby flattening an increasing area of the cornea as indicated in FIG. 4. Simultaneously the eye is observed through the one system of the binocular microscope 3 (the lower one in FIG. 1) and the body 40, whereby the normally circular contour or circumference of the flattened area is generally seen as two laterally displaced semi circles for instance as indicated in dotted lines in FIG. 5. With increasing pressure of the body 40 against the eye the diameter of the flattened area increases and therefore the near ends of the displaced semi circles (FIG. 5) gradually approach each other until both semi circles will be seen as a continuous S-shaped line as indicated in full lines in FIG. 5, when the diameter D (FIG. 4) of the flattened area exactly equals 3.06 mm. When this condition is adjusted the tonometric pressure may directly be read on the scale 34 which directly indicates the applied force in grams. This indication can be multiplied by a factor 10 as explained above for obtaining the tonometric pressure in mm. Hg. This measurement is extremely simple because the prism body 40 automatically indicates the correct size of the flattened area and the result may directly be read on a scale.

In order to improve the sharpness of the contour of the flattened area a solution of fluoroescein may preferably be applied to the cornea before flattening it. When the body 40 is applied against the cornea the solution is displaced from the flattened area into the gap G (FIG. 4). With the use of a blue filter a clear contrast is obtained in that the flattened area is seen in a dark blue colour whereas the solution of fluorescein surround the flattened surface is seen in a relatively yellow colour.

These features are not a part of the invention and are set out in detail in an article by Mr. H. Goldmann published in the "Bulletin et Mémoires de la Société Francaise d'Ophtalmologie," 1955, pages 474–478.

The tonometer shown in FIGS. 1 to 3 may only be used in the position shown in FIG. 1 for which the lever system 6, 7, 8 is pivotable in a horizontal plane around a vertical axis (shaft 5). For any other position of the system the weight 19 would no longer act onto the full horizontal lever arm 20 and therefore the pressures applied to the measuring body 40 would no longer be correct. Of course deviations from the correct values are not observed for very small inclinations of the measuring system of a few angular degrees. However, it is often desired to use the tonometer with its measuring arm 6 in a substantially vertical position. This is possible when the tonometer mechanisms illustrated in FIGS. 6 to 10 are used. In these illustrations corresponding parts are similarly designated as in FIGS. 1 to 3.

In the embodiment shown in FIGS. 6 and 7 the measuring arm 6 carrying the measuring body 38 has a counter weight 7 and is pivoted on a horizontal shaft 45. A rod 46 carrying a sliding weight 47 is connected to a mounting body 48 of the lever system 6, 7. A slide block 49 similar to the slide block 27 shown in FIGS. 1 to 3 and similarly guided for axial displacement by means of a spindle 31 controls the sliding weight by means of two ball bearings 50 laterally engaging the weight 47.

When the sliding block 49 is axially shifted by rotation of the actuating spindle 31 the sliding weight 47 is equally shifted on the rod 46. For the position of the sliding weight shown in FIGS. 6 and 7 the center of gravity of the sliding weight is shifted to the left relatively to a vertical plane comprising the pivot axis of the measuring arm 6 and therefore a turning moment acts onto the measuring arm 6 anticlockwise in FIG. 6 thereby urging the measuring body 38 against the cornea C of the eye to be tested. It is evident that by proper rotation of the spindle 31 the force with which the measuring body is applied against the cornea may be adjusted until the required flattening is obtained in the manner set out above. Due to the antifriction bearings 50 the sliding weight may execute a slight vertical motion practically without frictional resistance which would tend to falsify the measurement.

In the embodiment of the tonometer shown in FIGS. 8 to 10 the measuring arm 6 is fixed on a mounting body 51 pivoted on a horizontal shaft 52. The mounting body 51 has a flange 53 engaging a slot 54 of a swinging weight 55, the swinging weight being pivotable round a pivot pin 56 frictionally mounted in the flange 53 of the mounting body 51. The swinging weight 55 has a slot 57 and two ball bearings 58 of which the inner races are fixed at the bottom of this slot. The ball bearings 58 laterally engage with little clearance a control pin 59 fixed in a swinging arm 60 and extending through a bore 61 of the swinging weight 55. The swinging arm 60 is pivoted in a stationary part 62 by means of a pivot pin 63. A ball bearing 64 mounted on a downwardly extending end of the control pin 59 engages a groove 65 of a slide body 66 similar to the control groove 26 of slide block 27 shown in FIG. 3. The slide block 66 may be displaced on a spindle 31 in the manner set out above in connection with FIGS. 1 to 3.

In the position shown in FIG. 10 the center of gravity of the swinging weight 55 is in a vertical plane comprising the pivot axis of the measuring arm 6 and therefore no turning moment is exerted on the swinging arm. When the slide body 66 is shifted to the left in FIG. 8 or downwardly in FIG. 10 the swinging arm 60 and the swinging weight 55 are turned clockwise in FIG. 10, whereby the swinging weight reaches for instance the position shown in dotted lines in FIG. 10. Thereby the gravity center of the swinging weight 55 is shifted to the left in FIG. 8 and the weight exerts a turning moment on the measuring system in anticlockwise direction in FIG. 8 thereby urging the measuring body 38 against the cornea of the eye to be tested. For the reason set out above with reference to FIGS. 1 to 3 the displacement of the center of gravity of the swinging weight 55 is proportional to the axial displacement of the slide body 66 and therefore there is a linear relation between the rotation of spindle 31 and the force with which the measuring body 38 is urged against the cornea of the eye.

It may be seen that in the above described mechanisms for adjusting the pressure of the measuring body 38 the weight and the adjusting means for it are coupled in a manner avoiding frictional resistances opposing free displacement of the lever system comprising the measuring arm, so that falsification of the measurement by friction is avoided.

What we claim is:

1. An applanation tonometer of the type comprising a body having a plane measuring surface adapted to be applied against the cornea of an eye and further comprising a mechanism for urging the said body against the eye, a first lever carrying the said body and an actuating portion on the said first lever carrying an antifriction bearing, a second lever carrying a weight and having an actuating member contacting the said antifriction bearing of the first lever, a mounting structure for the said second lever adapted for rotation round a vertical axis, an axis of the said antifriction bearing substantial coaxial with the said vertical axis, an adjusting spindle for displacement of an adjusting member axially along the said adjusting spindle, a driving pin on the said mounting structure engaging the said adjusting member whereby rotation of the said mounting structure and second lever round the said vertical axis is caused upon displacement of the said adjusting member by the said spindle, the said weight and the said actuating member effecting thereby a rotary motion round the said vertical axis and the said antifriction bearing respectively, and the effective lever arm of the force transmitted from the said actuating member to the said antifriction bearing and first lever respectively being changed on rotation of the said second lever round the said vertical axis for accordingly varying the pressure by which the said measuring surface is applied against the cornea, a linear relation between the rotation of the said spindle and the variations of the said pressure being obtained by the said adjusting member axially displaceable along the spindle, and the said mounting structure and second lever respectively rotatable by the said adjusting member.

2. An applanation tonometer according to claim 1, the said adjusting member comprising a groove perpendicular to the axis of the said spindle and the displacing direction of the adjusting member respectively, the said driving pin engaging this groove.

3. An applanation tonometer of the type comprising a body having a plane measuring surface adapted to be applied against the cornea of an eye, a first lever carrying the said body and having an actuating portion, a second lever pivoted on a horizontal axis supported in a mounting structure rotatable round a vertical axis, a weight on the said second lever and an actuating member on the said second lever engaging the said actuating portion of the said first lever, adjusting means for angular adjustment of the said mounting structure and second lever respectively round the said vertical axis for angularly adjusting the direction wherein the said actuating member applies against the said actuating portion of the said first lever, the effective lever arm of the force transmitted from the said actuating member to the said first lever being thus changed on rotation of the said second lever round the said vertical axis for accordingly varying the pressure by which the said measuring surface is applied against the cornea, and a linear relation between the displacement of the said adjusting means and the variations of the said pressure.

4. A tonometer of the type having a measuring body adapted to be applied against the cornea of an eye and a mechanism for urging the said body against the eye, comprising a lever carrying the said body, a weight acting onto the said lever for producing a measuring pressure by which the said body is applied against the cornea, pressure transmitting means between the said lever and weight respectively, a relative displacement between such pressure transmitting means occurring due to the displacement of the said body during measurement, the said pressure transmitting means comprising antifriction-bearing means for reducing frictional resistances opposing the said relative displacement between the pressure transmitting means.

5. A tonometer of the type having a measuring body adapted to be applied against the cornea of an eye and a mechanism for urging the said body against the eye, comprising a lever carrying the said body and a weight acting onto the said lever for producing a measuring pressure by which the said body is applied against the cornea, means for adjusting the position of the said weight relative to the said lever in order to adjust the said measuring pressure, the said adjusting means being adapted for purely horizontal displacement of the weight but allowing vertical displacement of the weight relative to the adjusting means.

6. A tonometer according to claim 5, the said weight being displaceable on a portion connected to the said lever and the lever having a horizontal pivot axis, antifriction bearings being provided for transmitting the adjusting motion between the said adjusting means and the said weight thereby allowing positive displacement of the weight with the adjusting means but avoiding friction opposing vertical displacement of the weight relatively to its adjusting means.

7. A tonometer according to claim 6, the said adjusting means having two ball bearings horizontally spaced from each other and the said weight having a portion engaged between such ball bearings, the bearings providing positive displacement of the weight portion with the adjusting means in horizontal direction but allowing vertical displacement of the weight between the bearings practically without friction.

8. A tonometer of the type having a measuring body adapted to be applied against the cornea of an eye and a mechanism for urging the said body against the eye, comprising a lever carrying the said body, the said body and lever being rotatable round a substantially vertical axis in a substantially horizontal plane, an actuating portion on the said lever, an antifriction bearing having an inner race fixed on the said actuating portion of the lever and an outer race, a weight system rotatable round a vertical axis substantially coaxial with the axis of the said antifriction bearing when the said lever is in its operating position, an actuating member on the said weight system engaging the said outer race of the antifriction bearing and transmitting thereto a constant force produced by the said weight system, adjusting means for rotating the said weight system round its said vertical axis whereby the said actuating member engages the said outer race of the antifriction bearing in different angular positions for varying the turning moment transmitted to the said lever, transmission of turning moments to the said lever due to the said angular displacement of the weight system and actuating member respectively being avoided by the said antifriction bearing.

9. A tonometer of the type having a measuring body adapted to be applied against the cornea of an eye and a mechanism for urging the said body against the eye, comprising a lever carrying the said body, an actuating portion on the said lever, a weight system having an actuating member cooperating with the said actuating portion of the lever for transmitting a force from the said weight system to the said actuating portion of the lever and for producing a turning moment acting onto the said lever, adjusting means for adjusting the weight system relatively to the said lever for varying the turning moment acting onto the said lever, antifriction transmitting means for transmitting the said force from the weight system to the said actuating portion of the lever, transmission of turning moments to the said lever due to the said adjustment of the weight system relatively to the lever being prevented by the said antifriction transmitting means.

10. A tonometer of the type having a measuring body adapted to be applied against the cornea of an eye and a mechanism for urging the said body against the eye, the said mechanism comprising a lever carrying the body and pivotable round a lever axis, a lever portion carrying a weight displaceable on the said lever portion, a horizontal plane comprising the said lever axis, the said weight being displaceable in the horizontal plane comprising the lever axis, a center of gravity of the said weight, a turning moment being applied to the said lever by the said weight, this turning moment varying in accordance with the distance of the said center of gravity from the said lever axis, means for displacing the said weight in the said horizontal plane in order to change the said distance and the said turning moment respectively, actuating means for displacing the weight engaging the weight in the said horizontal plane comprising the lever axis so that no additional turning moment is transmitted to the lever due to the forces transmitted to the weight by the said actuating means when displacing the weight.

11. A tonometer according to claim 10, the weight being translatorily displaceable along an arm of the said lever.

12. A tonometer according to claim 10, the weight being pivotably mounted on a lever portion round a vertical axis.

13. An applanation tonometer of the type having a measuring body adapted to be applied against the cornea of an eye and a mechanism for urging the said body against the eye, the said mechanism comprising a lever carrying the body and pivotable round a lever axis, a weight system acting on a portion of the said lever for producing a turning moment, a center of gravity of the said weight system and a pivot axis for the weight system spaced from the center of gravity, adjusting means for the weight system adapted for translatory displacement, driving means on the weight system engaging such adjusting means, the center of gravity of the weight system being displaced in accordance with the translatory displacement of the adjusting means, and the turning moment acting on the said lever varying in accordance with the displacement of the center of gravity of the weight system, a linear relation being thereby established between the displacement of the said adjusting means and the turning moment acting on the said lever.

14. A tonometer of the type having a measuring body adapted to be applied against the cornea of an eye and a mechanism for urging the said body against the eye, comprising a lever carrying the said body, an actuating portion on the said lever, a weight system having an actuating member cooperating with the said actuating portion of the lever for transmitting a force from the said weight system to the said actuating portion of the lever and for producing a turning moment acting onto the said lever, a pivot axis for the said lever and a pivot axis for the said weight system, the said weight system being adapted to produce a turning moment acting in a plane, the direction of this plane being variable by rotation of the weight system round the said pivot axis of the weight system, a zero position of the said weight system wherein the said turning moment acts in a plane comprising the said pivot axis of the lever system so that no turning moment is transmitted from the weight system to the lever system, and a number of operating positions of the said weight system wherein the pivot axis of the lever is at a distance from the said plane, a turning moment being thereby transmitted from the weight system to the lever in accordance with the said distance.

15. A tonometer comprising a body having a plane pressure surface adapted to be applied against the cornea of an eye for producing a flattened area on the cornea, and further comprising a mechanism for urging the said body against the eye, the said mechanism being adjustable during the measurement for varying the weight by which the said body is urged against the eye, the said body being made of a transparent material such as glass or Plexiglas so that the said flattened area of the cornea may be observed through the said body and the body comprising an optical system for sidewise shifting at least a portion of the flattened area as observed through the said body.

16. A tonometer according to claim 15, the said body comprising two optical prisms symmetrically located on either side of a plane perpendicular to the said flattened portion, two symmetrical portions of the said flattened area appearing shifted relatively to each other by a predetermined distance when observed through the said prisms.

17. A tonometer according to claim 16, the said prisms causing shifting of the area portions as observed by equal amounts to opposite sides.

18. A tonometer for measuring the intraocular pressure, comprising measuring means of transparent material having a plane pressure surface adapted to be applied against an area of the cornea of an eye, a mechanism to urge said measuring means with said plane pressure surface ahead against said area, means for continuously adjusting said mechanism during measurement to vary the weight by which said measuring means is urged against said area, a microscope provided so that said area when flattened may be observed through said microscope and said measuring means, said measuring means including optical means at a fixed distance from said pressure surface for relative lateral displacement of portions of said flattened area as observed through said microscope and measuring means, said lateral displacement being invariably adjusted to a precisely determined value, one precisely determined diameter of said flattened area equal to said lateral displacement being thereby precisely indicated by said optical means.

References Cited in the file of this patent

UNITED STATES PATENTS

| | | |
|---|---|---|
| 2,366,645 | Ollendorff | Jan. 2, 1945 |
| 2,519,681 | Mages | Aug. 22, 1950 |
| 2,656,715 | Tolman | Oct. 27, 1953 |
| 2,836,173 | Uemura et al. | May 27, 1958 |

FOREIGN PATENTS

| | | |
|---|---|---|
| 559,952 | Germany | Sept. 26, 1932 |
| 748,282 | Great Britain | Apr. 25, 1956 |

OTHER REFERENCES

Goldmann article, Bull. Soc. franc. Ophtal: 67, page 474, 1955.

Schmidt: "Applanation Tonometry" Opthamologica 133: 337–343 April-May 1957. (Copy in Div. 55, class 128–2.)

Goldmann et al.: "Applanation Tonometry," Opthamologica 134: 221–242, October 1957. (Copy in Div. 55, class 128–2.)